United States Patent [19]

Boschetti et al.

[11] Patent Number: 5,053,135

[45] Date of Patent: Oct. 1, 1991

[54] COMPOSITE POLYMERS, THEIR PREPARATION AND THEIR USE IN LIQUID CHROMATOGRAPHY

[75] Inventors: Egisto Boschetti, Chatou; Pierre Girot, Paris, both of France

[73] Assignee: I.B.F., Villeneuve-La-Gareene, France

[21] Appl. No.: 521,988

[22] Filed: May 11, 1990

Related U.S. Application Data

[62] Division of Ser. No. 203,912, Jun. 8, 1988.

[30] Foreign Application Priority Data

Jun. 11, 1987 [FR] France .................................. 87 08125

[51] Int. Cl.$^5$ ............................................. B01D 15/08
[52] U.S. Cl. ..................................... 210/635; 210/656; 210/198.2; 210/502.1; 530/413; 530/417
[58] Field of Search ..................... 55/67, 386; 210/656, 210/198.2, 635, 502.1; 422/70; 436/161; 530/413, 417

[56] References Cited

U.S. PATENT DOCUMENTS

| | | | |
|---|---|---|---|
| 3,557,562 | 1/1971 | McLaughlin et al. | 405/264 |
| 4,281,233 | 7/1981 | Coupek et al. | 210/656 |
| 4,332,694 | 6/1982 | Kalal et al. | 252/189 |
| 4,396,476 | 8/1983 | Roemer et al. | 523/115 |
| 4,442,240 | 4/1984 | Suh | 523/116 |
| 4,658,000 | 4/1987 | Tyihak et al. | 210/656 |
| 4,724,207 | 2/1988 | Hou et al. | 210/656 |
| 4,937,000 | 6/1990 | Bomer et al. | 210/656 |

*Primary Examiner*—Peter Hruskoci
*Attorney, Agent, or Firm*—Morgan & Finnegan

[57] ABSTRACT

A homogeneous composite polymer containing, in an interpenetrated form, 20% to 80% by weight of silica and 80% to 20% by weight of a three-dimensional crosslinked acrylic, vinyl and/or allyl copolymer comprising, in a copolymerized form, 98% to 70% by weight of at least one monofunctional acrylic, vinyl or allyl monomer and 2% to 30% by weight of a difunctional acrylic or allyl crosslinking monomer is useful in liquid chromatography.

6 Claims, No Drawings

COMPOSITE POLYMERS, THEIR PREPARATION AND THEIR USE IN LIQUID CHROMATOGRAPHY

This is a divisional of application Ser. No. 203,912, filed June 8, 1988.

The present invention relates to composite polymers based on silica and on three-dimensional crosslinked copolymers which can be used in liquid chromatography techniques, particularly for the separation of biological compounds.

To be capable of being employed on an industrial scale, liquid chromatography supports must have the required physicochemical properties. In particular, they must be hydrophilic, chemically inert, stable to common chemical and physical agents, mechanically rigid, nonbiodegradable, capable of being modified chemically for the grafting molecules, of a porosity which is known and fully controlled at the time of the synthesis, capable of being obtained in the form of beads with a low scatter in diameter, and low in cost.

At the present time, no known support corresponds perfectly to all these demands.

The present invention provides new composite polymers whose physicochemical properties correspond more nearly to the industrial requirements than those of known polymers.

The composite polymers of the invention are homogeneous polymers containing, in an interpenetrated form, 20% to 80% by weight of silica and 80% to 20% by weight of a three-dimensional crosslinked acrylic, vinyl and/or allyl copolymer comprising, in a copolymerized form, 70% to 98% by weight of at least one monofunctional acrylic, vinyl or allyl monomer and 2% to 30% by weight of a difunctional acrylic or allyl cross-linking monomer.

The preferred composite polymers are those containing 20% to 50% by weight of silica and 50% to 80% by weight of the three-dimensional crosslinked acrylic, vinyl and/or allyl copolymer.

As monofunctional acrylic monomers there may be mentioned acrylamide, methacrylamide, N-[tris(hydroxymethyl)methyl]acrylamide, N-[tris(hydroxymethyl)methyl]-methacrylamide, methylolacrylamide, polyethylene glycol acrylate, N-acryloyl- or N-methacryloyl-2-amino-2-hydroxymethyl-1,3-propanediol, morpholinoethylacrylamide, diethylaminoethylacrylamide, diethylaminoethylmethacrylamide, triethylaminoethylacrylamide, trimethylaminopropylmethacrylamide, acrylic acid, methacrylic acid, 6-acrylamidohexanoic acid, acryloylglycine, acryloyl-β-alanine, acrylamidomethylpropanesulphonic acid, acryloylphosphocholamine and acrolein.

Vinylpyrrolidone and allylamine may be mentioned as monofunctional vinyl and allyl monomers.

As difunctional acrylic and allyl crosslinking monomers there may be mentioned N,N'-diallyltartardiamide, N,N'-methylenebisacrylamide, N,N'-hexamethylenebisacrylamide, N,N'-methylenebishydroxymethylacrylamide, glyoxalbisacrylamide, ethylene diacrylate and polyethylene glycol diacrylate.

The preferred acrylic and vinyl monomers are N-[tris(hydroxymethyl)methyl]acrylamide, N-[tris(hydroxymethyl)methyl]methacrylamide, diethylaminoethylacrylamide and vinylpyrrolidone. The preferred crosslinking monomer is N,N'-methylenebisacrylamide.

The composite polymers according to the invention may be prepared by simultaneous or sequential polymerization, in an aqueous medium, of sodium silicate, of one or more monofunctional vinyl, acrylic or allyl monomers and of a difunctional acrylic or allyl crosslinking monomer in the presence of a polymerization agent.

The process consists in adding an aqueous solution of sodium silicate to an aqueous solution, at pH 4–5, of the vinyl, acrylic or allyl monomer(s) and of the crosslinking monomer. The polymerization agent is added to this medium, which is stable for 2 to 3 hours at ambient temperature. The polymerization is conducted at a temperature which varies from 10° C. to 80° C. and preferably from 20° C. to 50° C.

The solution of the vinyl, acrylic or allyl monomer(s) is acidified to pH 4–5 with an organic or inorganic acid such as acetic acid or sulphuric acid.

The sodium silicate concentration of the aqueous solution subjected to the polymerization varies from 20 g/l to 200 g/l and preferably from 30 g/l to 150 g/l.

The concentration of acrylic, vinyl and/or allyl monomers in the aqueous solution subjected to the polymerization varies from 20 g/l to 250 g/l and preferably from 80 g/l to 160 g/l.

The ratio by weight of the acrylic, vinyl or allyl monomer(s) to the crosslinking monomer is between 50 and 3 and preferably between 20 and 5.

The concentration of the polymerization agents in the aqueous solution subjected to the polymerization varies from 1 g/l to 200 g/l.

The polymerization agent is an agent which is usually employed in radical polymerization. As such, there may be mentioned redox systems such as alkali metal persulphate+N,N,N',N'-tetramethylethylenediamine, alkali metal persulphate+dimethylaminopropionitrile, and 2,2'-azobisisobutyronitrile.

The polymerization may be a bulk or emulsion polymerization. In the case of the bulk polymerization, the aqueous solution containing the sodium silicate, the various monomers and the polymerization agent is subjected to a polymerization in homogeneous phase. The aqueous gel block which is obtained is then split up into particles by conventional physical means, is washed with water and/or with organic solvents, and is then dried until a powder is obtained.

The emulsion polymerization, which is the preferred preparative method because it yields the polymer directly in the form of spherical granules of defined size, may be carried out by emulsifying the aqueous sodium silicate solution and the monomers before polymerization, with stirring, in an immiscible organic liquid, optionally containing an emulsifying agent. The stirring speed is controlled so as to obtain an emulsion of the aqueous phase in the organic phase which has the required droplet size. Once the stirring speed has been adjusted, the polymerization agent is introduced into the emulsion and it initiates the polymerization. The spherical particles of polymer are recovered by gravity separation, are neutralized and filtered off and are then washed with water.

A product which enables the viscosity of the reaction medium to be increased, such as glycerol, may optionally be added to the aqueous solution subjected to the polymerization.

As an immiscible organic liquid which may be employed there may be mentioned, for example, vegetable oils (soya oil, groundnut oil, sunflower oil, and the like) or mineral oils (liquid paraffin, silicone oil, and the like), the products of fractional distillation of petroleum (benzene, toluene, and the like), chlorinated hydrocarbons (carbon tetrachloride, methylene chloride, and the like) and mixtures of these various compounds.

The organic phase may optionally contain an emulsifying agent such as the products known under the trade name "Arlacel C"; "Spans" or "Tweens" at a concentration of 0.05% to 5% by volume.

The pearls obtained by the emulsion polymerization process have a particle diameter which varies from 5 μm to 500 μm, depending on the operating conditions.

Polymers may also be obtained in a different form such as filters, plates or films, provided that the solution is preformed or moulded before polymerization.

The polymers according to the invention are thermally stable and are insensitive to bacterial or enzymatic attack. In addition, they are chemically stable in the presence of chaotropic agents, detergents and dissociating agents, and may be employed over a wide range of pH.

The polymers according to the invention may be employed in liquid chromatography techniques, especially for the separation of biological compounds such as sugars, amino acids, nucleotides, polysaccharides, proteins, nucleic acids and for the separation of organic molecules of different sizes, including polymers.

They enable these compounds to be separated either by molecular sieving (ionic monomers) or by ion exchanges (ionizable monomers) or by specificity (specific functionalized monomers).

The following examples illustrate the invention.

EXAMPLE 1

50 ml of glacial acetic acid, followed by 5 g of ammonium persulphate, are added to 200 ml of a solution comprising 150 mg/ml of N-[tris(hydroxymethyl)methyl]-acrylamide and 30 mg/ml of methylenebisacrylamide in demineralized water. 200 ml of an aqueous solution of sodium silicate at a concentration of 8.8%, i.e. 10° Bé, are added to the solution obtained in this manner. This new solution is stable for 2 to 3 hours at ambient temperature.

40 ml of N,N,N',N'-tetramethylethylenediamine (TEMED) are introduced into the organo-inorganic solution, with gentle stirring. After a few seconds, the reaction mixture is observed to become warm and to solidify rapidly. A rigid block of aqueous gel, ivory-white in colour, is thus obtained, and this can be dried in the open air or in an oven at a temperature between the ambient temperature and 120° C.

This block may be split up into particles using conventional methods.

EXAMPLE 2

The organo-inorganic solution prepared according to the process described in Example 1 is dispersed in 2 liters of gently stirred liquid paraffin, to which 1 ml of an emulsifying agent known under the trade name of "Arlacel C" has been added beforehand.

The stirring speed is controlled so as to obtain a stable emulsion, the droplets of which are between 5 μm and 500 μm in diameter.

A mixture consisting of 50 ml of TEMED, 5 ml of "Arlacel C" and 150 ml of liquid paraffin is added to this emulsion.

After a few seconds, a temperature rise of about ten degrees centigrade is observed. After returning to the ambient temperature, gravity separation takes place, the oily phase is removed by suction and the pearls obtained are washed with demineralized water. The suspension of pearls is adjusted to pH 6.5–7 by addition of normal sodium hydroxide solution and is then left stirred gently overnight.

The pearls are sieved and are then dried.

These pearls can be employed in chromatographic fractionations using molecular sieving.

EXAMPLE 3

1.6 l of glacial acetic acid and 160 g of ammonium persulphate are added to 8 liters of a solution comprising 300 g/l of N-[tris(hydroxymethyl)methyl]acrylamide and 30 g/l of methylenebisacrylamide in demineralized water. After the persulphate has dissolved, 8 liters of a solution prepared from 2.7 l of glycerol, 2.7 l of demineralized water and 2.7 of sodium silicate at a concentration of 35% in water (40° Bé) are added.

The organo-inorganic solution thus obtained is poured, with stirring, into 20 liters of liquid paraffin and 10 ml of an emulsifying agent known under the trade name of "Arlacel C".

The stirring speed is controlled so as to obtain a stable emulsion, the droplets of which are between 5 μm and 500 μm in diameter.

When the suspension is homogeneous, 2.3 l of a solution comprising 1.3 liters of TEMED, 256 ml of "Arlacel C" and 3.2 l of liquid paraffin is poured in. Half an hour after this first addition, another 2.3 l of this same solution of TEMED are added. An increase in temperature is observed at each of these additions of TEMED; the reaction mixture thus warms up from 25° C. to 41° C.

After return to ambient temperature, gravity separation takes place. The oily phase is removed by suction and the pearls obtained are washed with demineralized water. The suspension of pearls is adjusted to pH 6.5–7 by addition of normal sodium hydroxide solution and is then left stirred overnight.

After drying and rehydration, these pearls may be employed in chromatographic fractionations using molecular sieving.

EXAMPLE 4

70 ml of glacial acetic acid and 5 g of ammonium persulphate are added to 200 ml of a solution comprising 150 mg/ml of N-[tris(hydroxymethyl)methyl]acrylamide and 30 mg/ml of methylenebisacrylamide in demineralized water. After the persulphate has dissolved, 200 ml of a solution of sodium silicate at a concentration of 17.5%, i.e. 20° Bé, are added.

The organo-inorganic solution thus obtained is poured, with stirring, into 2 liters of liquid paraffin and 1 ml of an emulsifying agent known under the trade name of "Arlacel C".

The stirring speed is controlled so as to obtain a stable emulsion, the droplets of which are between 5 μm and 500 μm in diameter.

When the suspension is homogeneous, a mixture of 70 ml of TEMED, 120 ml of liquid paraffin and 5 ml of "Arlacel C" is added.

The pearls are recovered in a manner which is identical with the preceding examples.

This product can be employed as a chromatography support intended for gel-filtration.

EXAMPLE 5

34 ml of acetic acid, 80 ml of a solution of sodium silicate at a concentration of 17.5% and 2 g of ammonium persulphate are added to a solution obtained by heating to 55° C. 30 g of N-[tris(hydroxymethyl)-methyl]acrylamide, 2 g of dimethylaminoethylacrylamide and 6 g of methylenebisacrylamide made up to 80 ml with demineralized water and returned to ambient temperature.

The organo-inorganic solution thus obtained is poured, with stirring, into 1 liter of liquid paraffin and 3 ml of an emulsifying agent known under the trade name of "Arlacel C".

The stirring speed is controlled so as to obtain a stable emulsion, the droplets of which are between 5 μm and 500 μm in diameter.

When the suspension is homogeneous, a mixture of 70 ml of TEMED and 70 ml of liquid paraffin is added.

The pearls are recovered by the method described in Examples 2 and 3.

This product can be employed for carrying out ion exchange chromatography.

EXAMPLE 6

The procedure followed is as in Example 2, but with N-[tris(hydroxymethyl)methyl]acrylamide replaced by an identical quantity of N-[tris(hydroxymethyl)methyl]-methacrylamide.

The pearls obtained can be employed in chromatographic fractionations using molecular sieving.

EXAMPLE 7

25 ml of glacial acetic acid followed by 5 mg of ammonium persulphate are added to 200 ml of a solution comprising 230 mg/ml of acrylamide and 23 mg/ml of methylenebisacrylamide in demineralized water.

200 ml of an aqueous solution of sodium silicate at a concentration of 10% are added to the solution thus obtained.

The organo-inorganic solution thus obtained is poured, with stirring, into 2 liters of liquid paraffin containing 1 ml of an emulsifier known under the trade name of "Arlacel C".

The stirring speed is controlled so as to obtain a stable emulsion, the droplets of which are between 5 μm and 500 μm in diameter.

When the suspension is homogeneous, a mixture of 25 ml of TEMED, 120 ml of liquid paraffin and 5 ml of "Arlacel C" is added.

The pearls of polymers thus obtained are recovered in a manner which is identical with that described in the preceding examples.

This product can be employed as a chromatography support intended for gel-filtration.

EXAMPLE 8

80 ml of glacial acetic acid followed by 5 mg of ammonium persulphate are added to 200 ml of an aqueous solution comprising 150 mg/ml of vinylpyrrolidone and 50 mg/ml of methylenebisacrylamide.

200 ml of a solution of sodium silicate at a concentration of 14% are added to the solution thus obtained.

The organo-inorganic solution thus obtained is poured into 2 liters of liquid paraffin containing 1 ml of an emulsifier known under the trade name of "Arlacel C".

The stirring speed is controlled so as to obtain a stable emulsion, the droplets of which are between 5 μm and 500 μm in diameter.

When the suspension is homogeneous, a mixturre of 50 ml of TEMED, 120 ml of liquid paraffin and 5 ml of "Arlacel C" is added.

The pearls thus obtained are recovered in a manner which is similar to that described in the preceding examples.

This product can be employed as a chromatography support intended for gel-filtration.

EXAMPLE 9

90 ml of the gel obtained according to Example 3, whose particles are between 40 μm and 80 μm in diameter, are introduced into a glass column 1.6 cm in internal diameter and 50 cm in height.

Once the pearls of polymers have been packed down in the chromatography tube and have been washed with a pH 7.4, tris(hydromethyl)aminoethane/50 mM HCl, 0.15M NaCl buffer solution, the sample containing the substances to be separated is introduced at the top of the column.

This sample consists of 1 ml of the above buffer solution containing 10 ml of bovine albumin, 10 mg of β-lactoglobulin, 10 mg of myoglobin and 5 mg of cytochrome C. Elution is effected with the above buffer solution at a rate of 6.6 ml/h. The 4 substances contained in the sample are separated in this manner.

We claim:

1. A process for separating components of a liquid mixture by liquid chromatography, wherein the liquid mixture is brought into contact with a homogeneous composite hydrophilic polymer containing, in an interpenetrated form, 20% to 80% by weight of silica and 80% to 20% by weight of a three-dimensional crosslinked vinyl copolymer formed by copolymerization, in an aqueous sodium silicate medium, of 98% to 70% by weight of at least one monofunctional vinyl monomer and 2% to 30% by weight of a difunctional vinyl crosslinking monomer selected from the class consisting of difunctional acrylic and allyl cross-linking monomers.

2. A liquid chromatographic process as defined in claim 1, wherein the hydrophylic polymer contains 20% to 50% by weight of silica and 50% to 80% by weight of the three-dimensional crosslinked vinyl copolymer.

3. A liquid chromatographic process as defined in claim 1, wherein in the three-dimensional crosslinked copolymer the mono-functional vinyl monomer is acrylamide, methacrylamide, N-(tris(hydroxymethyl)methyl)acrylamide, N-tris(hydroxymethyl)methyl)methacrylamide, methylolacrylamide, polyethylene glycol acrylate, N-acryloyl- or N-methacryloyl-2-amino-2-hydroxymethyl-1,3-propanediol, morpholinoethylacrylamide, diethylaminoethylacrylamide, diethylaminoethylmethacrylamide, triethylaminoethyl-acrylamide, trimethylaminopropylmethacrylamide, acrylic acid, methacrylic acid, 6-acrylamidohexanoic acid, acryloylglycine, acryloylalanine, acrylamidomethylpropanesulphonic acid, acryloylphosphocholamine, acrolein, vinylpyrrolidone or allylamine.

4. A liquid chromatographic process as defined in claim 1, wherein in the three-dimensional crosslinked copolymer the crosslinking monomer is N,N'-diallyltartardiamide, N,N'-methylene-bisacrylamide, N,N'-hexamethylenebisacrylamide, N,N'-methylenebishydroxymethylacrylamide, glyoxalbisacrylamide, or polyethylene glycol diacrylate.

5. A liquid chromatographic process as defined in claim 1, wherein the said crosslinked vinyl copolymer comprises, in copolymerized form, 98% to 70% by weight of at least one monofunctional vinyl monomer selected from the class consisting of acrylic and allyl monomers and 2% to 30% by weight of a difunctional vinyl crosslinking monomer selected from the class consisting of difunctional acrylic crosslinking monomers.

6. A liquid chromatographic process as defined in claim 1, wherein the liquid mixture undergoing separation comprises a mixture of biological compounds.

* * * * *